Oct. 14, 1958 E. P. WIGNER ET AL 2,856,340
SHAPED FISSIONABLE METAL BODIES
Filed June 15, 1945

Witnesses:
Herbert E Metcalf
John B. Willard

Inventors:
Eugene P. Wigner
Robert R. Williamson
Gale J. Young
By Robert A Lavender
Attorney.

United States Patent Office 2,856,340
Patented Oct. 14, 1958

2,856,340

SHAPED FISSIONABLE METAL BODIES

Eugene P. Wigner, Chicago, Ill., Robert R. Williamson, Hoboken, N. J., and Gale J. Young, Chicago, Ill., assignors to the United States of America as represented by the United States Atomic Energy Commission Application June 15, 1945, Serial No. 599,538

16 Claims. (Cl. 204—193.2)

This invention relates to novel articles of manufacture used in and in combination with neutronic reactors. In neutronic reactors a neutron fissionable isotope such as $U^{233}$, $U^{235}$ or $94^{239}$ or mixtures thereof is subjected to fission by absorption of neutrons and a self-sustaining chain reaction is established by the neutrons evolved by the fission.

In general such reactors comprise bodies of compositions containing such fissionable material, for example, natural uranium, disposed in a neutron slowing material which slow the neutrons to thermal energies. Such a slowing material is termed a neutron moderator. Carbon, beryllium, and $D_2O$ are typical moderators suitable for such use. Heat is evolved during the reaction which is removed by passage of a coolant through the reactor or in heat exchange relationship therewith. Specific details of the theory and essential characteristics of such reactors are set forth in Fermi et al. Patent 2,708,656, dated May 17, 1955.

In one type of reactor described in the above application uranium metal rods or lumps are disposed in channels of a moderator made up of graphite blocks and coolant is passed through the channels to remove the heat developed.

The internal stresses in the uranium metal or other fissionable bodies that are set up while the uranium is being heated internally as a result of operation of a neutronic reactor are known to be rather great. The absolute values of the stresses set up are so high that, if the possibility of plastic deformation (i. e., "yielding" to the stresses) is disregarded, the stresses below the ultimate strength of the fissionable material would severely limit the power output. In the case of uranium, plastic deformation considerably decreases the internal stresses and consequently increases the permissible maximum temperature of operation and the resultant output of the neutronic reactor. However, when the uranium metal or other fissionable bodies are formed in large masses, these stresses may exceed the ability of the metal to adjust itself by expansion and plastic deformation at the high operating temperature desired.

The level at which the chain reaction may be maintained is limited by the maximum temperature at which the uranium bodies may be maintained. That portion of the uranium body most remote from the surface cooled by the circulating cooling fluid will be the hottest. It is desirable therefore to limit the maximum distance from any point in uranium body to a cooled surface.

Also provision of an increased surface for a given mass of uranium enables heat to be dissipated at a higher rate by maintaining the increased surface area at approximately the temperature of the cooling fluid.

It is an object of this invention to provide novel uranium or other fissionable metal bodies of a form such that expansion of the metal can take place without damage to the structure of the metal body and thus permit operation of the neutronic reactor at a high power output.

A further object is to provide fissionable bodies permitting a maximum internal stressing and plastic yielding thereof without fracture of the bodies.

In order to maintain the surface temperature of the bodies within a desired range during neutronic bombardment thereof, one practice is to subject them to the cooling action of a stream of suitable coolant such as water. Several methods have been utilized for this purpose including internal cooling wherein the fissionable elements in the neutronic reactor comprise uranium metal pipes through which a cooling fluid such as water flows. A second method may be designated as external cooling wherein uranium metal bodies or slugs are supported in conduits or passages through which a suitable cooling fluid flows. Additional internal stresses are set up in the uranium bodies by such cooling methods and provision must be made for relieving these stresses so as to prevent fracture.

Therefore, a still further object is to provide fissionable bodies having a form such that the stresses set up by the cooling action of the coolant on the surface of the bodies are at a minimum.

These and other objects of the invention, and the various features and details of the construction and arrangement thereof are hereinafter set forth and described with reference to the accompanying drawings, in which.

Figure 1:
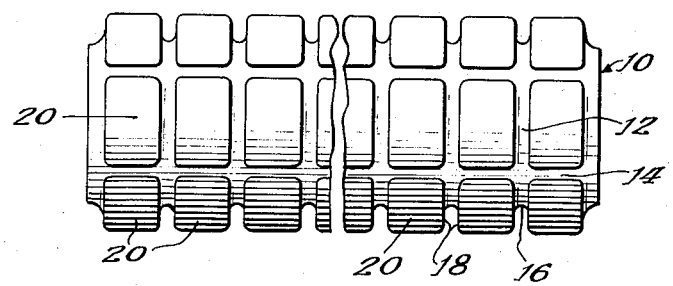
Fig. 1 is a side view in elevation of a fissionable metal body embodying the present invention adapted to be cooled externally.
Figure 2:
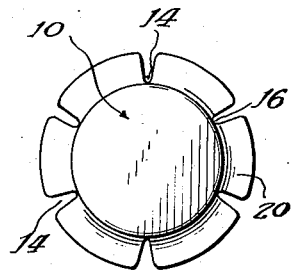
Fig. 2 is an end view of the fissionable body illustrated in Fig. 1.

Referring more particularly to the drawings, Figs. 1 and 2 illustrate a fissionable uranium metal body 10 of the externally cooled type adapted for use in a neutronic reactor. In the operation of one type of such neutronic reactors, a number of such uranium bodies 10 are inserted end to end in a tubular conduit or passage wherein the uranium bodies are subjected to bombardment by neutrons with the consequent production of fission products and the liberation of considerable heat. To maintain the surface temperature of the bodies 10 within a desired range during neutronic bombardment thereof, there is passed through the conduit or passage a stream of a suitable coolant such as, for example, air or water.

In accordance with the present invention, each uranium body 10 is provided with a multiplicity of protuberances projections or is subdivided by inwardly or outwardly extending grooves into sectors capable of expansion and contraction without danger of cracking or rupturing the body under the internal stresses imposed by the high temperature of operation and the differential cooling of the body.

More specifically, the body 10 is a generally cylindrical uranium metal member, the outer surface of which is provided with equally spaced annular peripheral grooves 12 and equally spaced longitudinal grooves 14. The bottoms of the grooves 12 and 14 are formed by semi-circular fillets 16 and the sides by radially extending walls 18, which form spaced protruding square lugs 20 so that the peripheral surface of the body 10 generally resembles a curved waffle plate.

With this construction, the annular lines of tension stress in the body 10 are disrupted at equally spaced intervals by the longitudinal grooves 14 thereby relieving the tension stresses in the outer portions of the body which would normally be most heavily stressed by the heavy expansion stresses produced by the intense heat concentrated at the axis of the body 10 during the neutronic bombardment thereof.

Similarly, the spaced annular peripheral grooves 12 disrupt, and relieve in equal increments, the tremendous axial tension stresses imposed by the differential radial cooling of the body 10 by the coolant.

Furthermore, inasmuch as the bottom fillets 16 of the disrupting grooves 12 and 14 are semi-circular, the stresses are evenly and uniformly relieved and there is less tendency to fracture at those vulnerable portions of the body.

In addition to these advantages, the sidewalls 18 and the fillets 16 provide additional peripheral cooling area for the coolant thus permitting the use of a body 10 of greater diameter than would be permissible in a smooth surfaced fissionable body.

It will be understood, that the spacing and depth of the grooves 12 and 14 may be varied according to the amount of stress relief and the amount of differential cooling desired in each application of the invention to the fissionable member of a neutronic reactor.

Figure 4:
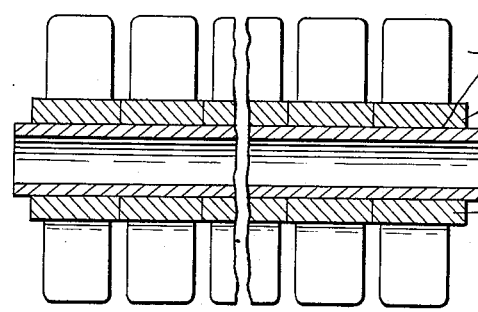
Fig. 4 is a cross-sectional view taken along line 4—4 of Fig. 3.
Figure 3:
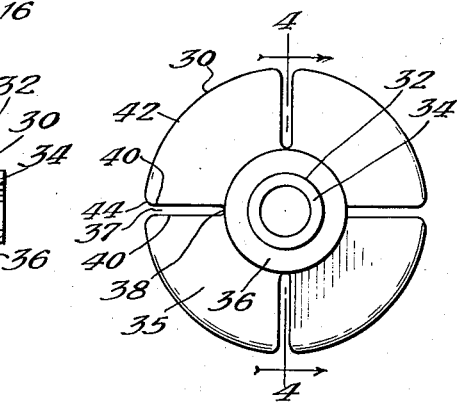
Fig. 3 is an end view of a second fissionable metal body embodying the present invention adapted to internal cooling.

Figs. 3 and 4 illustrate a second embodiment of the present invention wherein the fissionable member to be subjected to neutronic bombardment is adaptable for internal rather than external cooling in a neutronic reactor, and comprises a composite spaced series of uranium metal cogwheels 30. Any desired number of such cogwheels, which, for purposes of illustration are herein shown as five, may be fastened together as by threading interior bores 32 of the wheels 30, screwing them onto a threaded aluminum, or similar low neutron absorbent metal pipe 34, and cementing the two metals by means of a bonding agent such as lead-bismuth alloy.

More particularly, in this embodiment of the invention, each uranium metal cogwheel 30 comprises a relatively thick substantially circular plate 35 having a concentrically disposed hub portion 36 in which is axially located the threaded bore 32. In accordance with the present invention, radially spaced longitudinal slots or grooves 37 are formed by equally spaced, semi-circular bottom fillets 38 which are tangentially disposed relative to the hub 36, and spaced pairs of substantially radially extending groove or slot side walls 40 which divide the plate 35 into equal sectors 42, the outer corners of which are quarter-rounded as at 44. In the illustrated embodiment, the plate 35 is divided into four sectors 42 so that it generally resembles a four-leaf clover.

With this construction, the annular lines of tension stress in the cogwheels 30 are disrupted at equally spaced intervals by the longitudinal grooves 37 thereby relieving the tension stresses in the outer portions of the body comprising the sectors 42 which would normally be most heavily stressed by the large expansion stresses produced inwardly of the body during neutronic bombardment thereof.

Inasmuch as the embodiment described in conjunction with Figs. 3 and 4 is adapted for internal rather than external cooling, and since the greater amount of heat is generated inwardly of a fissionable body during neutronic bombardment, the problem of internal stresses resulting from a large temperature differential between the center and outer portions of the cogwheels 30 is not serious and can be provided for by limiting the thickness of the cogwheels 30 making up the fissionable composite body.

Figure 5:
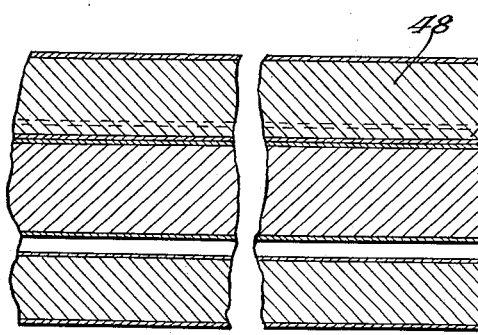
Fig. 5 is a sectional view of a compound fissionable body.
Figure 6:
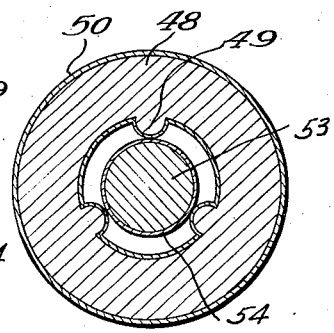
Fig. 6 is a sectional view taken on line 6—6 of Fig. 5.

Figs. 5 and 6 illustrate an embodiment of the invention in which emphasis is placed on the provision of a fissionable body in which a greatly increased surface area is presented to the cooling fluid over that which would be presented by the usual solid cylindrical body.

The fissionable element of Figs. 5 and 6 is adapted for both internal and external cooling of an outer tube shaped uranium body 48 having an irregular internal surface including internal projections in the form of longitudinal disposed surface irregularities or ribs 49 which serve to increase the internal surface area of the body 48. The body 48 is entirely covered both internally and externally by a jacket 50 of non-fissionable and non-corrosive material which serves to prevent corrosion of the uranium by a cooling fluid and also to prevent fission fragments from entering the cooling fluid.

The internal ribs 49 of the body 48 also serve to support an interior uranium body 53 with space for the passage of cooling fluid between the bodies 48 and 53. The body 53 is also provided with a jacket 54 of non-fissionable and non-corrosive material.

The compound body of Figs. 5 and 6 provide greatly increased surface area over that presented by a similar mass of uranium in simple cylindrical form, and likewise greatly reduced the linear distance from any point within the uranium to a cooling surface.

From the foregoing it will be seen that there is provided a number of arrangements or constructions of fissionable bodies adapted for use in neutronic reactors that accomplish the purposes and objects of this invention as previously outlined.

While a number of embodiments of the invention have been illustrated and described herein, it is not intended that the invention be limited to such disclosures, and changes and modifications may be made and incorporated as desired without departure from the invention as defined by the scope of the following claims.

What is claimed is:

1. A nuclear fissionable body having a waffle-like surface.

2. An article of manufacture consisting of a uranium body having a waffle-like surface.

3. An article of manufacture consisting of an aluminum tube, and a plurality of uranium bodies in the form of cogwheels each cogwheel being mounted coaxially about the tube and rigidly secured thereto to form a unitary structure.

4. An elongated, fissionable body having preformed therein spaced longitudinal grooves adapted to disrupt lines of internal stress in said body.

5. An elongated, fissionable body having spaced longitudinal and lateral grooves preformed therein.

6. A generally cylindrical uranium body having spaced annular peripheral grooves and spaced longitudinal grooves, the bottoms of said grooves comprising semi-circular fillets and the sides of said grooves comprising substantially radially extending spaced walls, said walls forming protruding lugs so that the cylindrical surface of said body generally resembles a curved waffle plate.

7. A body of fissionable material generally cylindrical in cross section and having a longitudinally ribbed bore.

8. A body of fissionable material generally cylindrical in cross section and having a bore of irregular cylindrical form.

9. A compound fissionable element comprising an exterior hollow generally cylindrical element of fissionable material and an interior generally cylindrical element of fissionable material, at least one of said elements having protrusions mutually spacing said elements and retaining them in coaxial relation.

10. A compound fissionable element comprising an exterior hollow generally cylindrical element and an interior generally cylindrical element carried by said exterior element, said interior element being shaped to provide a space between said elements.

11. A body of fissionable material of generally cylindrical cross section shaped to provide an internal passageway therethrough of irregular cylindrical form.

12. A body of fissionable material of generally cylindrical cross section shaped to provide an internal passageway therethrough of irregular cylindrical form, said interior element being shaped externally to engage said exterior element for providing a space between said elements, and said exterior element being further shaped internally to provide an internal passageway therethrough of irregular cylindrical form.

13. In a neutronic reactor, a hollow tube of material having a small neutron capture cross section and neutron fission cross section, a plurality of discs of material fissionable by thermal neutrons having central orifices therethrough shaped to accommodate the tube, and said tube being mounted within the orifices of the discs, said discs being rigidly secured thereto, and spaced from adjacent discs.

14. In a neutronic reactor, the structure recited in claim 13 in combination with a bonding material having a small neutron capture cross section between the discs and the tube.

15. A generally cylindrical fissionable body comprising, in combination, a tube constructed of materials having low neutron fission and neutron absorption cross sections, a plurality of cogwheels containing material fissionable by thermal neutrons, each of said cog wheels having a central orifice shaped to accommodate the tube, and said cogwheels being mounted coaxially on the tube and secured thereto to form a unitary structure.

16. A fissionable metal body comprising, in combination, a plurality of circular plate portions having concentrically disposed hollow hub portions, each of said plate portions containing material fissionable by thermal neutrons, a metal pipe disposed within said hollow hubs constructed of a material having small neutron capture and neutron fission cross sections, and a bonding material disposed between the hub portions of the plate portions and the pipe, said material having a low neutron capture cross section and rigidly securing the plate portions to the pipe to form a unitary structure.

References Cited in the file of this patent

UNITED STATES PATENTS

| | | |
|---|---|---|
| 1,019,394 | Weintraub | Mar. 5, 1912 |
| 1,106,384 | Hughes | Aug. 11, 1914 |
| 1,579,779 | Rentschler | Apr. 6, 1926 |
| 1,840,651 | Bassler | Jan 12, 1932 |
| 1,886,830 | Murray | Nov. 8, 1932 |
| 2,345,722 | Atlee | Apr. 4, 1944 |
| 2,393,036 | Farr | Jan. 15, 1946 |

FOREIGN PATENTS

| | | |
|---|---|---|
| 861,390 | France | Oct. 28, 1940 |
| 233,011 | Switzerland | Oct. 2, 1944 |

OTHER REFERENCES

Kelly et al.: Physical Review, 73, 1135–9 (1948).